(12) United States Patent
Bergström et al.

(10) Patent No.: US 10,004,014 B2
(45) Date of Patent: Jun. 19, 2018

(54) WIRELESS COMMUNICATION DEVICE AS CONTEXT FORWARDING ENTITY

(71) Applicant: Telefonaktiebolaget LM Ericsson (publ), Stockholm (SE)

(72) Inventors: Andreas Bergström, Vikingstad (SE);
Fredrik Gunnarsson, Linköping (SE);
Karl Norrman, Stockholm (SE);
Pradeepa Ramachandra, Linköping (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days. days.

(21) Appl. No.: 14/912,410

(22) PCT Filed: Nov. 30, 2015

(86) PCT No.: PCT/SE2015/051287
§ 371 (c)(1),
(2) Date: Feb. 17, 2016

(87) PCT Pub. No.: WO2017/095278
PCT Pub. Date: Jun. 8, 2017

(65) Prior Publication Data
US 2016/0255555 A1 Sep. 1, 2016

(51) Int. Cl.
*H04L 29/06* (2006.01)
*H04W 36/08* (2009.01)
(Continued)

(52) U.S. Cl.
CPC ........... *H04W 36/08* (2013.01); *H04W 12/02* (2013.01); *H04W 12/04* (2013.01); *H04W 36/0038* (2013.01)

(58) Field of Classification Search
CPC ......... H04W 36/0038; H04W 36/0033; H04W 36/0022; H04W 36/0055; H04W 36/08;
(Continued)

(56) References Cited

U.S. PATENT DOCUMENTS 7,171,215 B2* 1/2007 Khouaja ............... H04W 36/30
370/331
7,248,873 B2* 7/2007 Lehtinen ........... H04W 36/0083
455/436
(Continued)

FOREIGN PATENT DOCUMENTS

CN 104349409 A 2/2015
EP 2582164 A1 4/2013

OTHER PUBLICATIONS

Liu, Liang, et al. "Analysis of handover performance improvement in cloud-RAN architecture." Communications and Networking in China (CHINACOM), 2012 7th International ICST Conference on. IEEE, 2012.*
(Continued)

*Primary Examiner* — Syed Zaidi
(74) *Attorney, Agent, or Firm* — Murphy, Bilak & Homiller, PLLC

(57) ABSTRACT

The invention relates to network nodes, a wireless communication device, WCD, and methods therein for handover. The method in the WCD comprises obtaining, from a source network node, information comprising at least part of a WCD Context related to the WCD. The method further comprises connecting to a target network node, and forwarding the obtained information to the target network node, enabling the target network node to derive the WCD Context based on the information.

30 Claims, 9 Drawing Sheets

(51) Int. Cl.
*H04W 12/04* (2009.01)
*H04W 36/00* (2009.01)
*H04W 12/02* (2009.01)

(58) Field of Classification Search
CPC . H04W 36/0083; H04W 12/08; H04W 12/02; H04W 12/04; H04W 12/06
USPC .......................................................... 713/171
See application file for complete search history.

(56) References Cited

U.S. PATENT DOCUMENTS

| | | | | |
|---|---|---|---|---|
| 7,613,147 | B2* | 11/2009 | Bergenlid | H04L 29/06 370/329 |
| 8,295,488 | B2* | 10/2012 | Forsberg | H04L 63/04 380/277 |
| 8,311,540 | B2* | 11/2012 | Kakumaru | H04W 36/36 370/331 |
| 8,824,304 | B2* | 9/2014 | Vulkan | H04L 65/80 370/238 |
| 8,891,489 | B2* | 11/2014 | Attar | H04W 36/245 370/332 |
| 2007/0060127 | A1* | 3/2007 | Forsberg | H04L 63/061 455/436 |
| 2007/0110009 | A1* | 5/2007 | Bachmann | H04L 12/2856 370/338 |
| 2007/0265008 | A1* | 11/2007 | Feder | H04W 36/0033 455/436 |
| 2008/0240439 | A1* | 10/2008 | Mukherjee | H04W 28/06 380/272 |
| 2008/0267407 | A1* | 10/2008 | Vanderveen | H04L 9/083 380/277 |
| 2009/0285176 | A1 | 11/2009 | Zheng et al. | |
| 2010/0177737 | A1* | 7/2010 | Song | H04W 36/0038 370/331 |
| 2010/0238900 | A1* | 9/2010 | Johansson | H04W 36/02 370/331 |
| 2012/0315905 | A1* | 12/2012 | Zhu | H04W 36/36 455/436 |
| 2013/0229939 | A1* | 9/2013 | Teyeb | H04W 36/30 370/252 |
| 2014/0185585 | A1 | 7/2014 | Zhang et al. | |
| 2015/0031367 | A1 | 1/2015 | Singh et al. | |

OTHER PUBLICATIONS

Duan, Xiaoyu, and Xianbin Wang. "Authentication handover and privacy protection in 5G hetnets using software-defined networking." IEEE Communications Magazine 53.4 (Apr. 8, 2015): 28-35.*
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.4.0 (Dec. 2014), Dec. 2014, 1-251.
3GPP, "3rd Generation Partnership Project; Technical Specification Group Services and System Aspects; 3GPP System Architecture Evolution (SAE); Security architecture (Release 12)", 3GPP TS 33.401 V12.14.0 (Mar. 2015), Mar. 2015, 1-131.
"Security in LTE backhauling", A White Paper by the NGMN Alliance Version 1.0, Feb. 29, 2012, 1-29.

* cited by examiner

WIRELESS COMMUNICATION DEVICE AS CONTEXT FORWARDING ENTITY

TECHNICAL FIELD

The invention relates to handover in a wireless communication network.

BACKGROUND

The 3GPP defined telecommunications system LTE provides communication services to User Equipment (UE), and other types of Wireless Communication Devices (WCDs). The LTE architecture includes a Mobility Management Entity (MME), which is responsible for control signaling. An SAE Gateway (SAE-GW) is responsible for the user data. The SAE-GW comprises two different parts, namely a Serving Gateway that routes user data packets, and a Packet Data Network (PDN) Gateway that provides connectivity between a WCD and an external data network. All these nodes are interconnected by an Internet Protocol (IP) network. Further nodes are the eNodeBs (eNBs) which act as base stations in the LTE network and communicate with the WCD. There are three major protocols and interfaces between these node types. These are S1-MME (between the eNB and the MME), S1-U (between the eNB and the S-GW, and X2 (between two eNBs). The corresponding protocols used in these interfaces are S1AP (S1 Application Protocol) and X2AP (X2 Application Protocol). All these protocols and interfaces are IP-based. In addition, the network may contain other nodes that are part of the above interface, for example a Home eNB Gateway (HeNB GW) between a Home eNB and rest of the nodes in the network. The MME is often located in the core network and the eNBs are often located in the radio access network. An illustration of a simplified LTE network is given in FIG. 11.

The LTE system provides confidentiality and integrity protection for data transmitted between the network and a WCD. These security services are provided by the use of encryption and integrity protection algorithms. Such algorithms are jointly described hereinafter as security algorithms. For encryption and integrity protection to work in LTE, the network and the WCD must use the same security algorithms to process the data. The processing using the security algorithms is carried out by the MMEs and the eNBs.

Integrity protection is a mechanism that ensures that the receiver of a message can verify that the received message is exactly the message that the transmitter sent. In addition in two party security protocol (as is used in LTE), the receiver further gets a guarantee that the message originates from the claimed transmitter. This property is achieved by using an integrity checksum computed over the message using a key that both the sender and receiver has access to. The mechanism guards against "man in the middle" attacks where the senders messages are intercepted by an adversary and a modified message is relayed to the receiver.

Encryption is a mechanism providing confidentiality for transmitted data. The sender encrypts the data with a secret key that is only known to the sender and receiver. Because of this, only the receiver is able to decrypt the message. The mechanism guards against adversaries obtaining the data in clear text even when they are able to intercept the transmission.

LTE divides the network into two strata, the Access Stratum (AS) and the Non-Access Stratum (NAS). Each stratum enjoys integrity and confidentiality protection individually. The control protocol for NAS is referred to as the NAS protocol and it is run between the WCD and the MME. The control protocol for AS is called Radio Resource Control (RRC) protocol and runs between the WCD and the eNB. The user plane traffic is also confidentiality protected in AS between the WCD and the eNB. The user plane is further protected by the transport network security when it traverses the backhaul network between the eNB and the core network.

To provide the different encryption and integrity protection functions, LTE uses a key hierarchy as illustrated in FIG. 2. Keys in the hierarchy are derived from other keys closer to the root of the hierarchy or keys at the same level. At the top of the hierarchy is the key stored in the USIM in the WCD. A copy of the same key is stored in the Home Subscriber Server (HSS) in the network. This key is the bases for the Authentication and Key Agreement (AKA) procedure that the MME and WCD run to achieve mutual authentication and establish the root-session key $K_{ASME}$. Mutual authentication is a procedure by which the WCD and the MME can gain assurance about that each entity really is who it claims to be. From the $K_{ASME}$, the WCD and the MME derives keys for protecting NAS ($K_{NAS\,enc}$ and $K_{NAS\,int}$) and a base-key for the AS security, called the $K_{eNB}$. The MME then securely transfers the $K_{eNB}$ to the eNB.

The eNB and the WCD can then derive keys for AS protection, $K_{RRC\,enc}$ and $K_{RRC\,int}$ for protection of the RRC protocol, and $K_{UP\,enc}$ for protection of the user plane.

LTE allows WCDs to move between base stations, and there are principally two sets of mobility procedures considered in both the current 3GPP Long Term Evolution (LTE) standard as well as in the ongoing 5G discussions.

The first one is denoted 'Idle Mode Mobility' and defines how a WCD which is deemed 'Idle', i.e. a WCD which has no ongoing nor recent data transfer, shall be able to reach the network using random access procedures and how to be reachable from the network by means of paging procedures etc.

The other one is 'Active Mode Mobility', which has the main task of maintaining the connectivity for an 'Active' or 'Connected' WCD, i.e. a WCD which actually has an ongoing or recent data transfer, as it moves around in the network, and also to handle abnormal cases such as failed handovers, radio link failures etc.

As an example of signaling in a handover procedure, an X2-based handover procedure for an LTE system where the network functions are anchored in the same Mobility Management Entity (MME) and Serving Gateway (S-GW) is illustrated in FIG. 1. The figure is taken from 3GPP TS 36.300 "E-UTRA(N) Overall Description; Stage 2" version: V12.4.0 (2014-12), and gives a general overview of the actions involved in a handover procedure.

An eNB serving an active WCD may detect that another eNB is better suited to serve the active WCD, for example because of better radio conditions. The serving eNB, also denoted source eNB in handover situations, may then hand over the WCD to the other eNB, which is typically referred to as a target eNB. There are two different procedures for performing a handover. The first procedure is a core network assisted handover that is called S1 handover (S1-HO). The second procedure is a handover without core network assistance called X2 handover (X2-HO). The names come from the primary network interfaces, S1 and X2, used during the execution of the handovers.

Regardless of whether it is an S1 or X2 handover, there are two necessary functions that the handover signaling needs to achieve when it comes to security. The first function is to transfer at least keying material and security capabilities supported by the WCD from the source eNB to the target eNB. The term security capabilities should here be understood to comprise encryption algorithms and integrity protection algorithms. The second function is for the target eNB to select which encryption and integrity algorithms to use with the WCD, and signal the choice to the WCD.

S1 Handover: In an S1 handover, the source eNB and target eNB are not directly connected. Instead, the source eNB sends a handover required message to the MME containing the security capabilities of the WCD. The MME then derives the so-called NextHop key (NH) and sends it to the target eNB, together with the WCD's security capabilities. The target eNB uses the NH key to derive the base key $K_{eNB}$ for the target eNB, for communication with the WCD, and sends a handover command containing the chosen algorithms to the source node. Finally, the source eNB forwards the message to the WCD which replies to the target eNB by a handover completed message.

X2 Handover can be performed after the WCD has completed all necessary procedures to activate RRC and NAS security. An X2 handover is initiated by the source eNB calculating a so-called $K_{eNB}^*$ key from the currently active so-called $K_{eNB}$ key, shared between the source eNB and the WCD, and sending it together with the WCD security capabilities to the target eNB in a handover request message. The target eNB replies with the required configuration information for the WCD connection. This information includes the chosen algorithms that the target eNB and the WCD shall use for communication. The source eNB then forwards the reply to the WCD, which confirms the handover with a completion message to the target eNB. In the last step, the target eNB retrieves a new key called the Next Hop key, NH, from the MME. The NH key, which is derived from the so-called $K_{ASME}$ key, is to be used as a basis for the $K_{eNB}^*$ calculation in the next handover event e.g. as described in 3GPP TS 33.401 "3GPP System Architecture Evolution (SAE); Security architecture", version 12.14.0 (2015-03).

The backhaul network supporting the X2 and S1 interfaces can be considered to be trusted or untrusted. A backhaul network can for example be considered trusted if access to the physical locations of the network components is restricted and controlled. For an untrusted network, it is mandatory to implement a layer to add security, typically via secure tunnels to encapsulate X2 and S1 etc.

SUMMARY

It is desired to improve existing solutions for handover. This is achieved by embodiments disclosed herein, and in the appended set of claims. Embodiments of the solution provide benefit in many situations e.g. in that it reduces the time duration required to perform a handover between two self-backhauled nodes and/or it reduces the amount of data required to be transmitted over a backhaul link, hence freeing up these resources.

According to a first aspect, a method for handover is provided, which is to be performed by a WCD connected to a first network node. The method comprises obtaining, from the first network node, information comprising at least part of a WCD Context related to the WCD. The method further comprises connecting to a second network node, and forwarding the obtained information to the second network node, enabling the second network node to derive the WCD Context based on the information.

According to a second aspect, a method for handover is provided, which is to be performed by a first network node connected to a WCD. The first network node is a source network node to the WCD in the handover. The method comprises: when the WCD is to be handed over from the first network node to a second network node: providing information comprising at least part of a WCD Context to the WCD for further transfer to the second network node, the WCD Context being related to the WCD.

According to a third aspect, a method for handover is provided, which is to be performed by a second network node, where the second network node is a target network node to the WCD in the handover. The method comprises obtaining information comprising at least part of a WCD Context from a WCD to be handed over from a first network node to the second network node, the WCD Context being related to the WCD. The method further comprises deriving the WCD Context based on the obtained information; and, transmitting a message to the WCD based on the WCD Context.

According to a fourth aspect, a WCD is provided, which is configured to obtain, from a first network node, when being connected to said first network node, information comprising at least part of a WCD Context related to the WCD. The WCD is further configured to connect to a second network node and to forward the obtained information to the second network node, enabling the second network node to derive the WCD Context based on the information.

According to a fifth aspect, a first network node is provided which is configured to: when a WCD connected to the first network node is to be handed over from the first network node to a second network node: provide information comprising at least part of a WCD Context to the WCD for further transfer to the second network node, the WCD Context being related to the WCD.

According to a sixth aspect, a second network node is provided, which is configured to obtain information comprising at least part of a WCD Context from a WCD to be handed over from a first network node to the second network node, the WCD Context being related to the WCD. The second network node is further configured to derive the WCD Context based on the obtained information; and to transmit a message to the WCD based on the WCD Context.

According to a seventh aspect, the use of a WCD for transfer of a WCD context between a source network node and a target network node in association with a handover of the WCD from the first network node to the second network node is provided.

According to an eighth aspect, a computer program is provided, which comprises instructions which, when executed on at least one processor, cause the at least one processor to carry out the method according to any of claims 1-20.

According to a ninth aspect, a carrier is provided, which contains the computer program of the preceding aspect, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
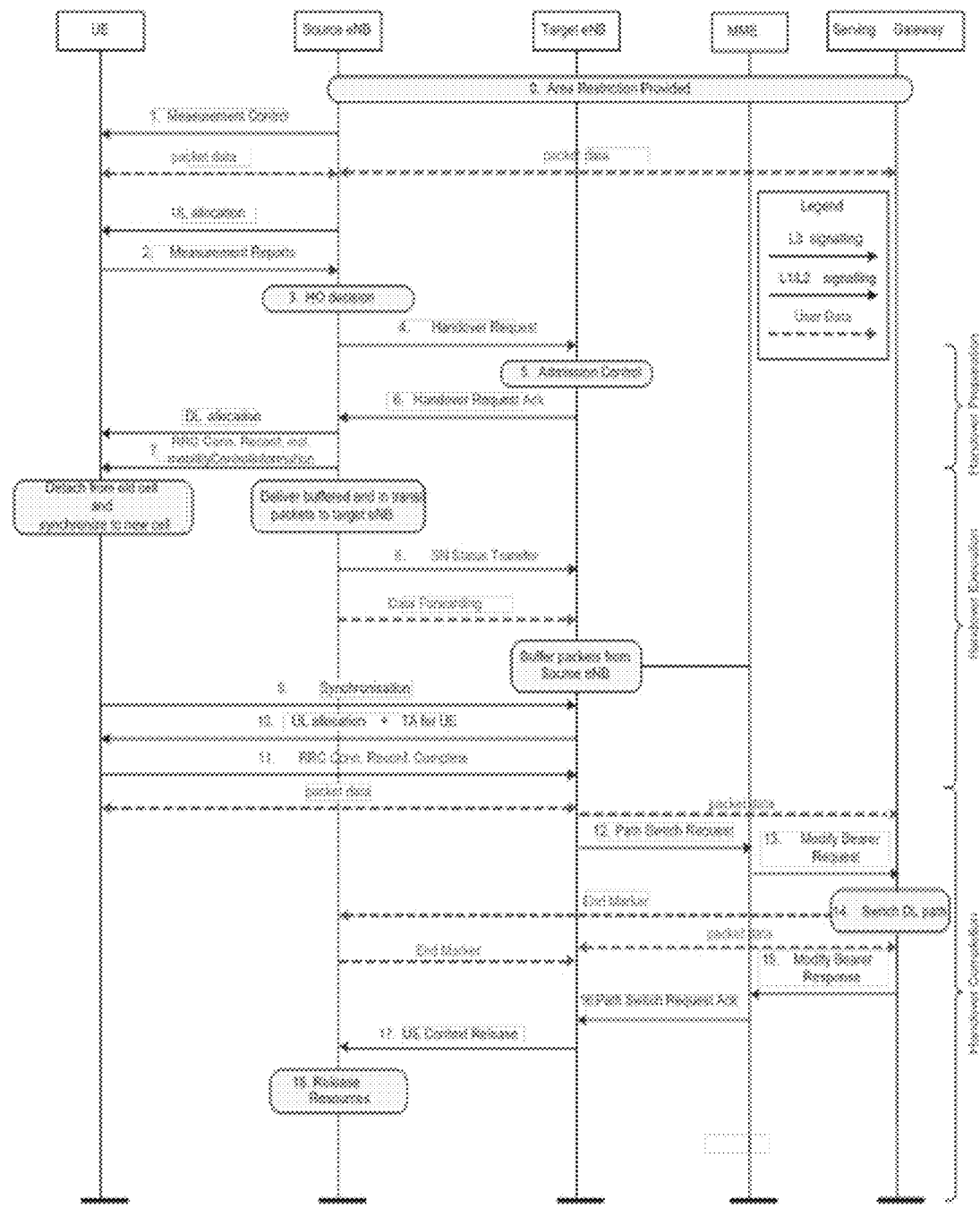
FIG. 1 is a signaling diagram exemplifying signaling between nodes during an intra-MME handover scenario, according to the prior art.
Figure 2:
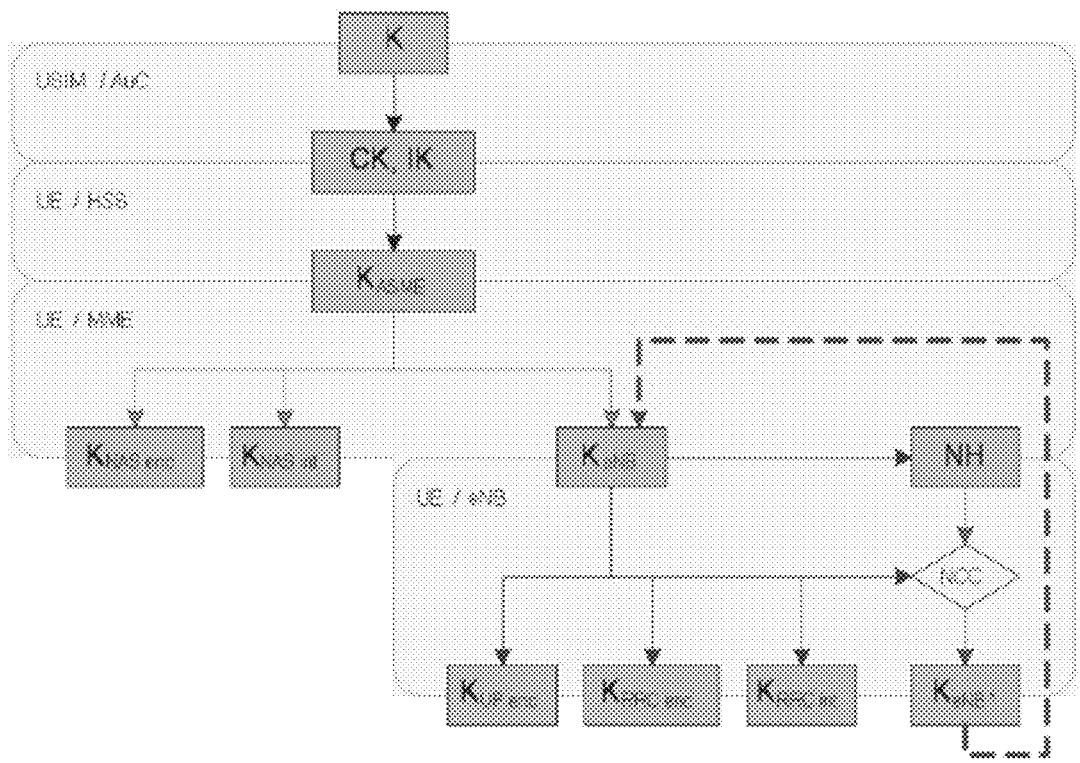
FIG. 2 illustrates a simplified view of the key hierarchy in LTE, according to the prior art.
Figure 3:
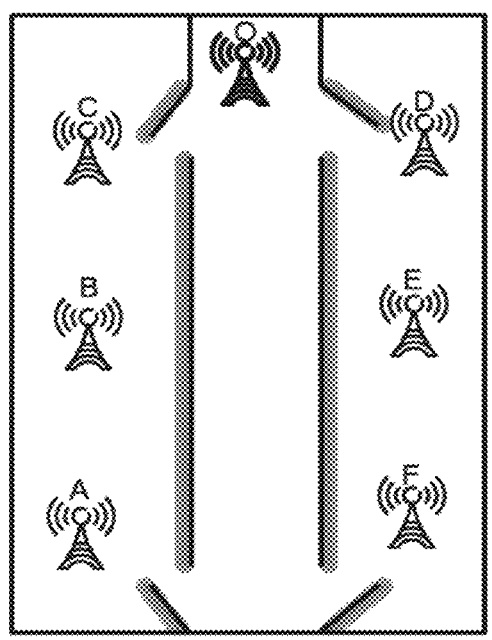
FIG. 3 is a schematic view of an indoor self-backhauled multi-hop scenario where exemplifying embodiments of the invention may be applied.

Consider the indoor deployment scenario as depicted in FIG. 3. This deployment contains one master/gateway node (O), which holds the connection to the core network, as well as six other network nodes, access nodes (A-F), which are connected self-backhauled in a multi-hop fashion. Moreover, in this scenario, it is assumed that the network nodes A, B, C are well-isolated from the network nodes D, E, F. This is a realistic scenario in e.g. an indoor office situation, with network nodes A, B, C and D, E, F being e.g. on separate floors, on opposite sides of a corridor, or similar.

Network node A connects to the master/gateway node O via network nodes B and C so that e.g. any communication between the WCD and the core network will traverse the path A-B-C-O. Now, consider a handover situation when a WCD connected to network node A is to be handed over to network node F. The HO request from network node A sent to network node F will then be sent over the path A-B-C-O-D-E-F, which obviously will cost quite a bit in terms of delay and also capacity.

Herein, a solution is disclosed which can make communication as the one described above between the nodes A and F faster, or, in some situations, even make it possible. According to embodiments described herein, a WCD is used as means to forward its own WCD context, from a source network node to a target network node, during its own inter-node active handover procedure. An overview of this procedure is shown in FIG. 4.

Figure 4:
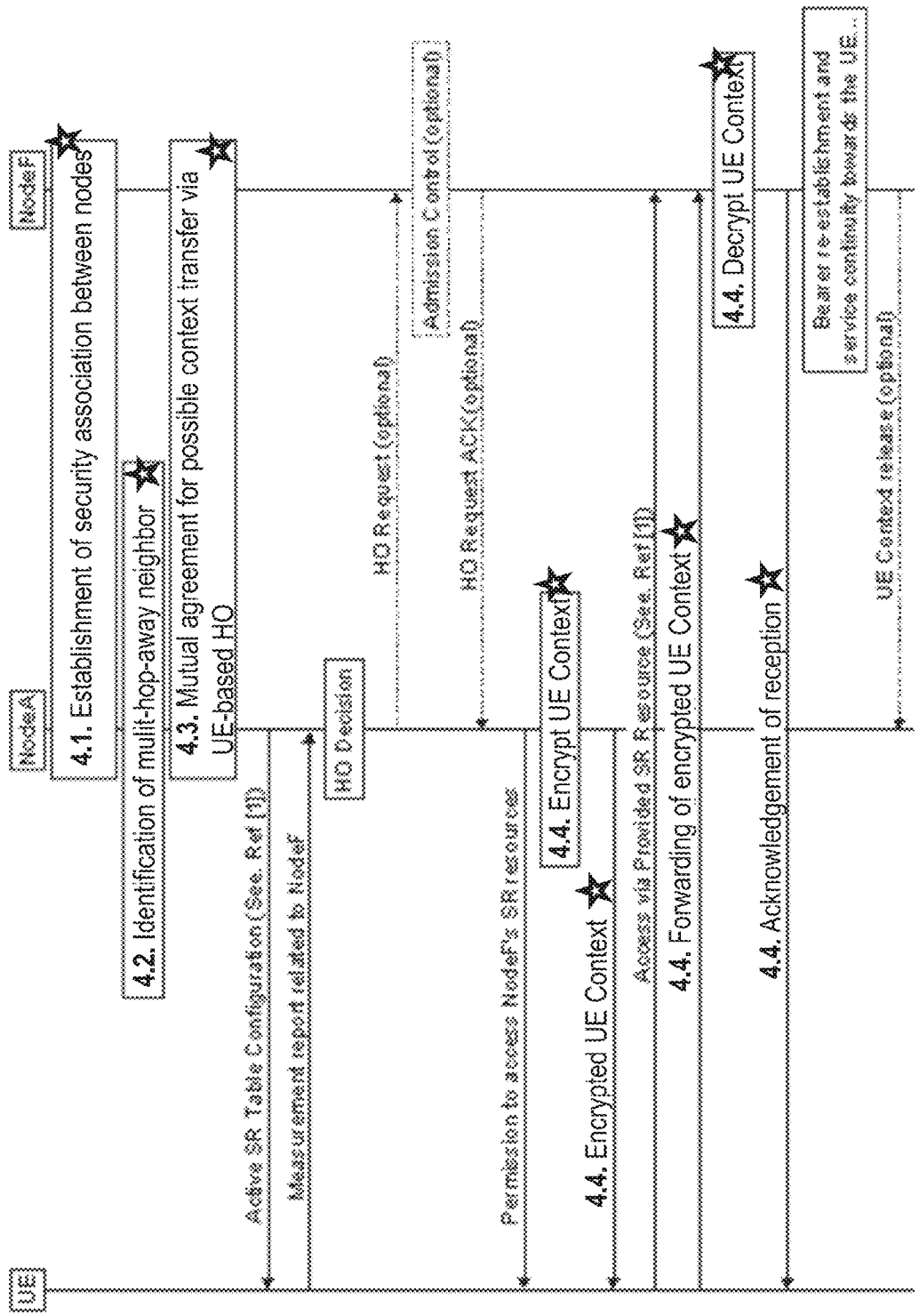
FIG. 4 is a signaling diagram showing actions performed in a handover scenario according to an exemplifying embodiment.

In FIG. 4, some actions refer to an "Active SR Table" and "Provided SR Resources". These actions refer to an assumed scenario in which additional Scheduling Request (SR) resources may be allocated in neighbor nodes and be indicated to the WCD by the source node in form of a so-called "Active SR Table". This allows the WCD to directly access a target node without having to perform a full-fledged random access procedure towards the node. This "Active SR Table" could be provided e.g. to all WCDs connected to a given node or only to those WCDs that are deemed to require a handover soon, as based on e.g. measurements indicating declining link quality etc. This solution may be applied together with embodiments described herein as an alternative to performing a random access procedure towards the target network node.

In FIG. 4, items marked with a black star are steps or actions related to embodiments disclosed herein which are performed in addition to an existing procedure used for LTE or as an alternative to actions of an existing procedure. Each such step or action is enumerated with a number, which will be referred to when describing the step or action in more detail below.

The example in FIG. 4 is, for illustrative purposes, constructed for a handover of a WCD from network node A to network node F in the network scenario illustrated in FIG. 3. Below, the actions introduced herein will be described in more detail. As previously stated, these actions and/or signaling is marked with a star and a number, 4.1-4.4. The steps of the exemplifying procedure illustrated in FIG. 4 will be described in more detail below with reference to these numbers. The introduced steps, marked with a star, may be referred to as belonging to different phases, where steps 4.1 to 4.3 describe a first phase, and the remaining steps numbered 4.4 describe WCD specific steps of a second phase. In the first phase the source and target network nodes establish whether the two network nodes shall consider using the "context transfer via WCD" feature for handovers in general (multi-hop handovers in this example); and, in the second phase, the "context transfer via WCD" feature is executed on a per-WCD basis. The first phase may be performed very seldom, e.g. once, at least when stationary network nodes are concerned. In other words, the first phase need not be performed for each handover, but is more long-term. It is important to note that during the second phase, there is no need for the source network node and the target network node to communicate directly; all communication required for a handover can be performed using the WCD as a communications channel. Below, the actions 4.1-4.4 in FIG. 4 will be described in more detail.

Action 4.1 in FIG. 4: Establishment of Security Association Between the Nodes.

Prior to performing the improved handover of the embodiments described herein, the source network node and target network node need to arrange so that the WCD Security Context can be securely transferred. The WCD Security Context is part of the WCD Context and needs to be integrity protected, confidentiality protected and replay protected. To this end, a shared key may be established for the network nodes, i.e. the source network node and the target network node. Establishing of the shared key could be done in numerous ways. One way is to install a pre-shared key in both the source network node and target network node via OAM (Operations and Management). Another way is to manually enter the key in the network nodes. A third option is to use the computer network authentication protocol Kerberos. In this example, the key shared between the source and the target network node will be referred to as $K_{AF}$ ("AF" due to handover between node A and node F in FIG. 3). It should be noted, that even though this example is related to a multi-hop connection, as illustrated in FIG. 3, this is not the only situation where embodiments of the solution may be applied.

Action 4.2 in FIG. 4: Identification of a 'Multi-Hop Away' Neighbor.

In order to find out whether the "Context transfer via WCD" feature should be applied between the source node and the target node, the backhaul link between the network nodes should be evaluated (at least once). In this specific example, there are multiple hops between the nodes, which cause a delay. The source node thus needs to identify characteristics of the backhaul link, such as how far away the target node is, in terms of number of hops/nodes, and/or delay. There are many ways to do this, and some example methods are mentioned below;

a) Identify the time difference between the time of sending a HO request to the neighbor (via the backhaul link) and the time of receiving the acknowledgement from the neighbor. If this time difference is larger than a certain threshold, then the neighbor/target node is said to be a multi-hop away neighbor.

b) According to an assumed future solution, a field could be added in the header (of e.g. a HO request) that will be incremented by each hop that is part of the communication chain between the source and the target node. By comparing the content of this field after a HO request acknowledgement reception, the source node will be able to identify if the neighbor is multi hop away or not.

Action 4.3 in FIG. 4: Mutual Agreement for Possible Context Transfer Via WCD.

When the source network node has identified that a neighbor is a multi-hop away neighbor, the network node will agree with the neighbor node for the transfer of WCD context via the WCD for faster HO process. This will be e.g. a one-time process wherein the source and the neighbor/target node agree upon the used procedure for WCD context transfer. The agreement may be valid for handover in both directions.

Action 4.4 in FIG. 4: Key and WCD Security Capabilities Exchange.

The source network node prepares the handover by constructing a WCD security context container. The container holds all information necessary for the target network node to establish a secure RRC connection with the WCD. This may be expressed as that the information is self-contained. This information comprises a new, "fresh", security key $K_{eNB}*$ and the security algorithms supported by the WCD, i.e. the WCD security capabilities. To prevent replay attacks against the target network node, the source network node may add a sequence number to the container. The sequence number is increased for each container constructed by the source network node. Once the source network node has created the container, the source network node encrypts at least part of the container and calculates a Message Authentication Code (MAC) over at least part of the container and appends the MAC to the container. Both the encryption and MAC operations use keys derived from the KAF. The source network node then provides the protected container to the WCD. The container may also contain an identifier for the key shared between the two network nodes. Alternatively, the container contains an identifier for the source network node. The identifier is covered by the MAC calculation, but it is not encrypted.

The WCD may request resources for forwarding the container to the target network node by using the scheduling request (SR) resources that were provided e.g. via the SR table by the sourced network node. In embodiments without SR table functionality or if no SR table has been provided, the WCD may perform a random access procedure towards the target network node in order to deliver the container. The target network node uses the identifier in the container to obtain the correct shared key. The target network node then verifies that the MAC is correctly calculated. If the verification succeeds, the target network node verifies that the sequence number in the container is not previously seen by the target network node. This may be performed by verifying that the received sequence number is larger than any sequence number received from the source network node before. If the sequence number is smaller or equal, the target network node deems the container being replayed and discards it. Otherwise, the network node decrypts the container and obtains the $K_{eNB}*$ and the WCD security capabilities. Using the latter, the target network node selects suitable encryption and integrity algorithms. The target network node now constructs Access Stratum (AS) security context for the WCD. The $K_{eNB}$ in this AS security context is derived from, or is equal to, the $K_{eNB}*$.

At this point, the target network node sends an acknowledgement message to the WCD. The acknowledgement message comprises identifiers for the selected security algorithms. These identifiers are integrity protected by a MAC using a key derived from the $K_{eNB}$ of the newly created AS security context. When the WCD receives the acknowledge message, the WCD calculates the $K_{eNB}*$ from that the same $K_{eNB}$ that the target network node did. The WCD determines which integrity algorithm to use based on the identifier in the message and verifies the integrity of the message. If the verification is successful, the WCD considers the handover completed.

The target network node optionally completes the handover by sending a complete message to the source network node. An alternative is that the source network node starts a timer when the encrypted WCD context was sent to the WCD, and releases the WCD context once the timer expires. The timer can be either pre-configured or configurable via an interface to the network node, in a preferred mode configurable via an OAM system node.

Figure 5:
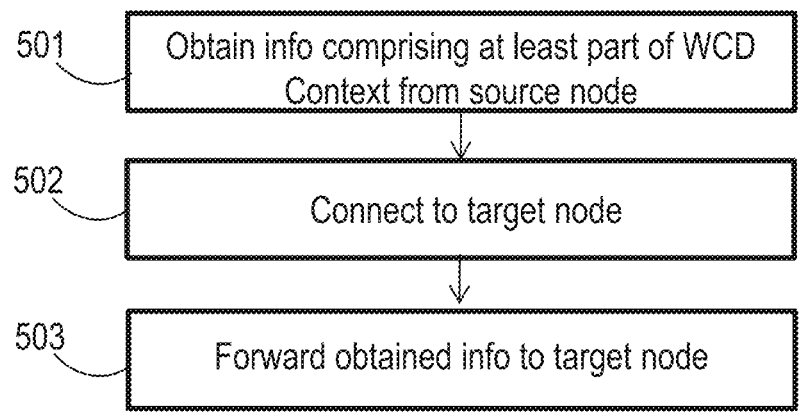
FIG. 5 is a flow chart showing a method according to an exemplifying embodiment from the perspective of a wireless communication device.
Figure 6:
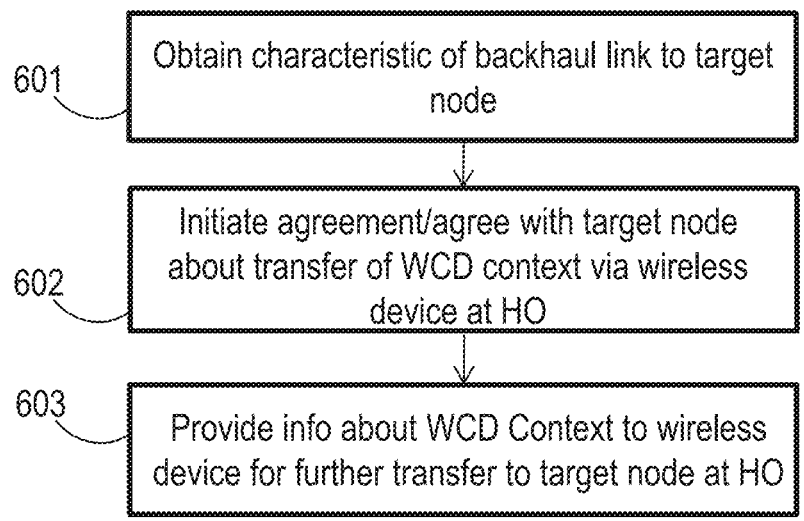
FIG. 6 is a flow chart showing a method according to an exemplifying embodiment from the perspective of a first network node being a source network node
Figure 7A:
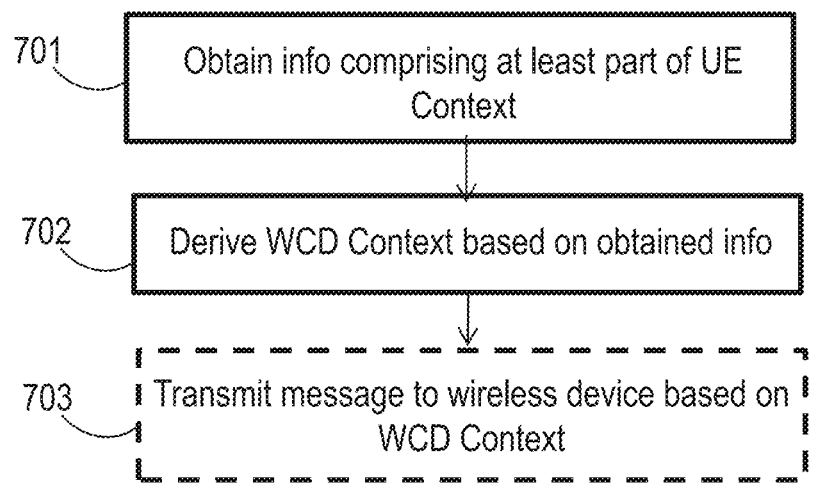
FIGS. 7a and 7b are flow charts showing methods according to exemplifying embodiments from the perspective of a second network node, a target network node.
Figure 7B:
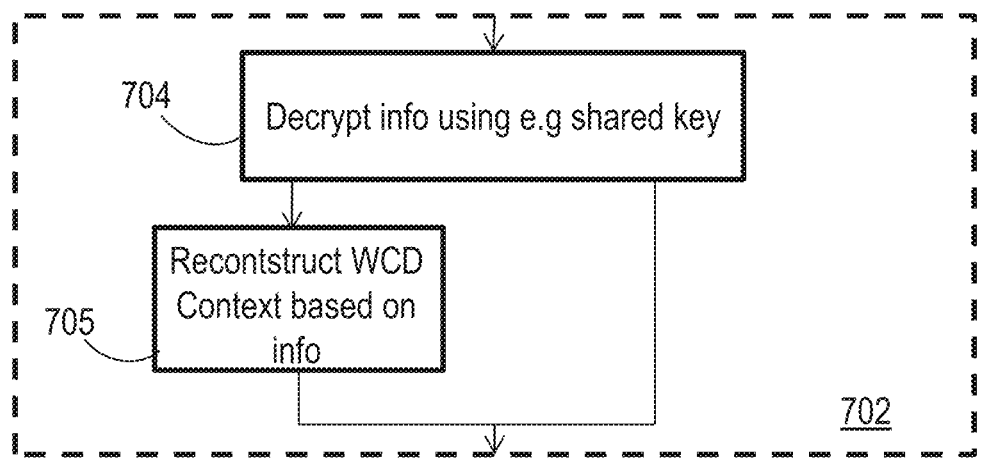

FIGS. 5-7b show exemplifying generalized method embodiments from the perspectives of the different nodes involved in a handover. FIG. 5 shows an exemplifying method performed by a wireless communication device, WCD. FIG. 6 shows an exemplifying method performed by a first network node having the role of source network node in relation to the WCD. FIGS. 7a and 7b show exemplifying methods performed by a second network node, having the role of target network node in relation to the WCD. For further exemplifying details see also the features of previously described embodiments.

FIG. 5 shows an exemplifying method for handover performed by a WCD connected to a first network node. The method comprises obtaining 501, from the first network node, information comprising at least part of a WCD Context related to the WCD. This could alternatively be described as obtaining, e.g. receiving, information enabling establishment, e.g. reconstruction of a WCD Context at a target network node, or, as obtaining information about a WCD Context. The method further comprises forwarding 503 the obtained information to a second network node. By doing this, the WCD enables the second network node to derive the WCD Context, i.e. provides the WCD Context to the second network node and/or enables the second network node to reconstruct the WCD Context based on the information. In order to forward the obtained information, the WCD connects 502 to the second network node, e.g. using provided SR resources or performing a regular random access procedure. A signaling connection, such as a bearer, between the WCD and the second network node may then be established by the second network node based on the forwarded information.

The term WCD Context is herein meant to refer to a state and/or settings associated with the WCD and the connection between the source network node and the WCD. "WCD Context" can e.g. be state information relating to the WCD, bearer configurations, parts or all of what is currently referred to as "UE context" in the LTE standard. In the examples above, the term "UE Context" is used as having the meaning of a state and/or settings associated with a UE/WCD and the connection between the source network node and the UE/WCD. In other words, the term WCD/UE Context is used in the meaning of a context kept in a radio access node (network node), such as an eNB, and a WCD/UE, i.e. a context related to a connection between the radio access node and the WCD/UE. The obtained information may be transferred in a so-called container, constructed by the source network node. The container may be denoted e.g. WCD security context container. The information may further be obtained in an encrypted format, which may not be decryptable by the WCD, but only to the target node, which is the intended recipient of the information. The WCD Context, to which the information is related, is a WCD Context which is related to the WCD itself, and may comprise diverse information. The information should be self-contained, in that a recipient of the information should be enabled to derive, e.g. establish or reconstruct, a WCD Context based on the information, and to establish a signaling connection with the WCD based on the derived WCD Context. When the information comprises only parts of the WCD Context, the information left out should be such information that the target node can replace or set to default values. That is, the target network node should not need to request or have been prepared with any information from the source network node to use together with the information it receives from the WCD to establish or re-construct the WCD context from the information. The target network node may use local data, e.g., data radio bearer identifiers, when establishing or re-constructing the WCD context from the information. Examples of WCD Context data which may be excluded from the transferred information are items that can be set to default values. For instance, if a new $K_{eNB}$ is derived by the target network node, then it is possible to re-set the so-called PDCP COUNT(ers) (part of e.g. UE Context in LTE) to zero in the target network node. The reason for not sending a complete WCD Context could be e.g. to save radio resources. In other words, it could be beneficial to only transfer information, without which the target network node cannot establish or re-construct a WCD Context. In other words, the included information should preferably at least be such information that cannot be concluded and/or cannot be reconstructed or replaced in a satisfying manner by the target node.

The security aspect of forwarding of a WCD Context via a WCD is considered to be important in many situations. According to embodiments described herein, information forwarded by the WCD may indicate, e.g. identify, a security key $K_A$, and/or information about security capabilities of the WCD. The information could alternatively or in addition comprise a security key derived from at least part of a WCD context shared between the WCD and the first network node. The key $K_A$ is a key shared between the source network node and the target network node. An indirect indication or identifier of the key $K_A$ could be an indication or identifier of the source network node, based on which the target network node could conclude which key to use to decrypt the information. In the examples above, this key was exemplified by a key denoted $K_{AF}$. The indication of this key would typically not itself be encrypted. In other words, the information forwarded by the WCD may be encrypted by the source network node, except for the indication of a key $K_A$, should it be part of the information. The WCD security capabilities may comprise e.g. information about which encryption and integrity algorithms that are supported by the WCD, i.e. implemented in the WCD.

The connecting 503 to the second network node based on the WCD Context may thus correspond to responding to that the target network node establishes a signaling connection, e.g. establishes bearers, based on the WCD Context.

FIG. 6 shows an exemplifying method for handover performed by a first network node connected to a WCD, and being a source network node to the WCD in the handover situation. When the WCD is to be handed over from the source network node to a second network node, i.e. a target network node, the method comprises providing 603 information comprising at least part of a WCD Context to the WCD for further transfer to the second network node, the WCD Context being related to the WCD. In other words, instead of sending the information about a WCD context (related to the WCD to be handed over) via a backhaul link, e.g. the path A-B-C-O-D-E-F in FIG. 3, the information is provided to the target network node via the WCD which is to be handed over. The information comprising at least part of a WCD Context should have the qualities as described above, i.e. enable the target network node to derive the WCD Context, possibly involving some reconstruction.

The transfer of WCD Context via a wireless device at HO is most beneficial in situations where the backhaul connection between the source network node and the target network node is restricted or "slow" in some way. Either capacity wise or, e.g., due to multi-hop, as previously described. Therefore, the method may also comprise obtaining 602 a characteristic of a backhaul link between the first network node and the second network node. The characteristic may be e.g. an estimated capacity, an expected delay or a number of node-hops to the target node. The characteristic may be obtained e.g. based on statistics from handovers performed between the network nodes, as previously mentioned. The method may further comprise initiating an agreement, or agreeing 602, with the second network node, based on the obtained characteristic, about possible transfer of information comprising at least part of a WCD Context to the second network node via a WCD for handover.

FIG. 7a shows an exemplifying method for handover performed by a second network node being a target network node to the WCD in the handover situation. The method comprises obtaining 701 information comprising at least part of a WCD Context from a WCD to be handed over from a first network node to the second network node. The WCD Context is related to the WCD to be handed over. The method further comprising deriving 702 the WCD Context based on the obtained information. The second network node may then transmit 703 a message to the WCD based on the WCD Context. The transmitting of a message is mentioned here as representing that the second network node may connect to the WCD based on the WCD Context and communicate with the WCD based on the WCD Context. The deriving 702 of the WCD Context could comprise decrypting 704 the obtained information e.g. using a key which is shared between the source and target node, as previously described, and also illustrated in FIG. 7b. The deriving of the WCD Context could comprise obtaining the complete WCD Context from the information, when a complete WCD Context is comprised in the information. Alternatively, the deriving of the WCD Context could comprise reconstructing 705 the WCD Context from or based on the obtained information, in cases where restorable parts of the WCD Context have been left out, i.e. have not been transferred as part of the information. This action is also illustrated in FIG. 7b.

The methods illustrated in FIGS. 7a and 7b could further comprise providing an acknowledgement of the reception of the information to the WCD (not illustrated). This acknowledgement may comprise an indication of a security algorithm, selected by the second network node based on the WCD Context, e.g. based on included information about the security capabilities of the WCD.

The security algorithm is selected for use to encrypt data between the WCD and the second network node, and should be used by the WCD when communicating with the second network node.

The methods and techniques described above may be implemented in a wireless communication network, e.g. in wireless communication devices and in network nodes, such as eNBs and other types of radio access nodes.

Figure 8A:
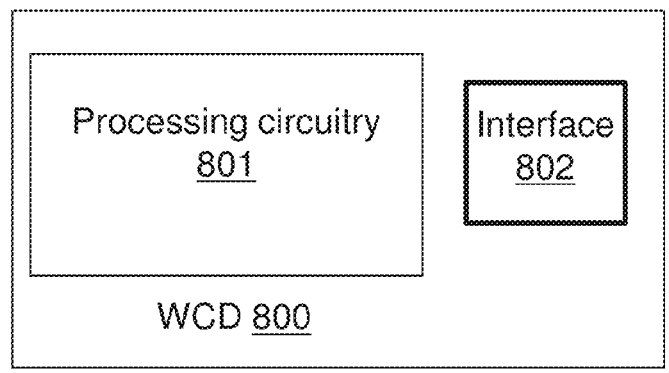
FIGS. 8a-c illustrate different implementations of a wireless communication device according to exemplifying embodiments.
Figure 8B:
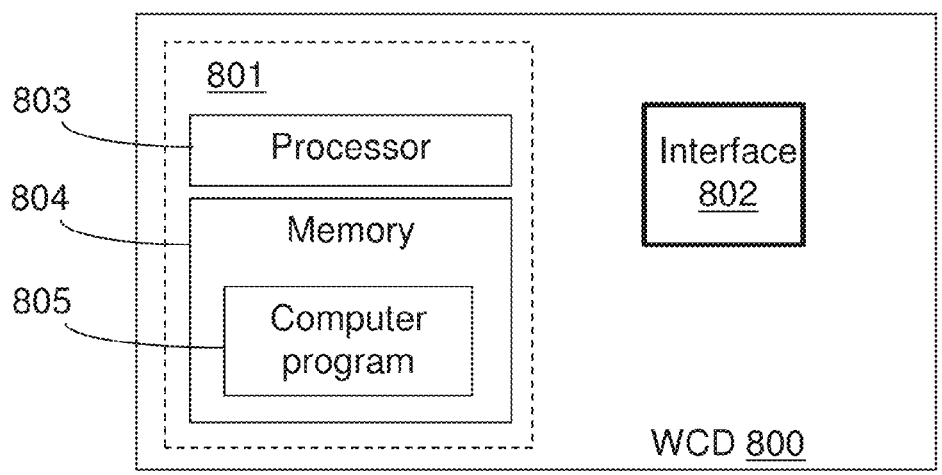
Figure 8C:
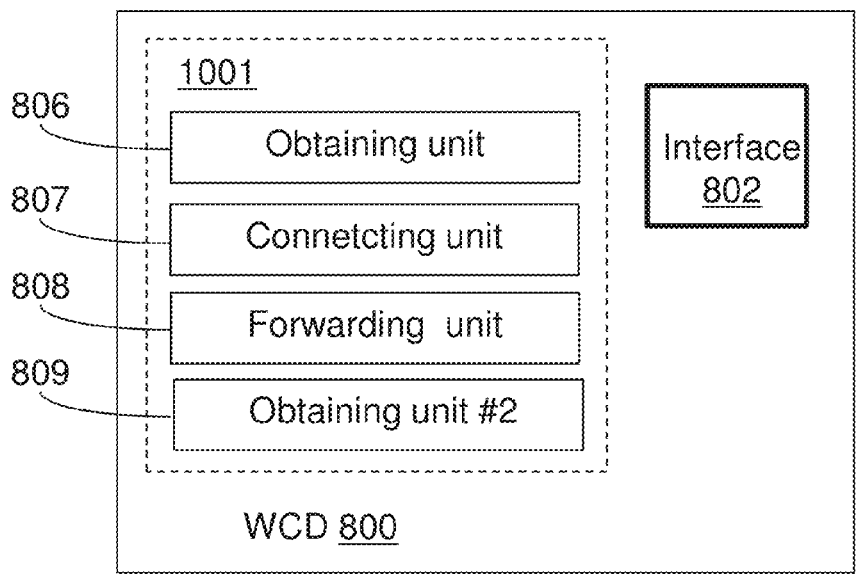

WCD, FIGS. 8a-8c

An exemplifying embodiment of a WCD is illustrated in a general manner in FIG. 8a. The WCD may, as previously described, be a UE configured to be operable in a wireless communication network. The WCD 800 is configured to perform at least one of the method embodiments described above with reference to any of FIGS. 4-5.

The WCD 800 is associated with the same technical features, objects and advantages as the previously described method embodiments. The WCD will be described in brief in order to avoid unnecessary repetition.

The WCD may be implemented and/or described as follows:

The WCD 800 comprises processing circuitry 801 and a communication interface 802. The processing circuitry 801 is configured to cause the WCD 800 to obtain, from a first network node to which it is connected, information comprising at least part of a WCD Context related to the WCD. The processing circuitry 801 is further configured to cause the WCD to connect to a second network node, and to forward the obtained information to the second network node, thus enabling the second network node to derive the WCD Context based on the information. The communication interface 802, which may also be denoted e.g. Input/Output (I/O) interface, includes a network interface for sending data to and receiving data from other nodes or entities.

The processing circuitry 801 could, as illustrated in FIG. 8b, comprise processing means, such as a processor 803, e.g. a CPU, and a memory 804 for storing or holding instructions. The memory would then comprise instructions, e.g. in form of a computer program 805, which when executed by the processing means 803 causes the WCD 800 to perform the actions described above.

An alternative implementation of the processing circuitry 801 is shown in FIG. 8c. The processing circuitry here comprises an obtaining unit 806, configured to cause the WCD to obtain, from a first network node to which it is connected, information comprising at least part of a WCD Context related to the WCD. The processing circuitry further comprises a connecting unit 807, configured to cause the WCD to connect to a second network node, a target network node. The processing circuitry further comprises a forwarding unit 808, configured to forward the obtained information to the second network node, thus enabling the second network node to derive the WCD Context based on the information, and to establish a signaling connection, a bearer, to the WCD based on the derived WCD Context. The processing circuitry could comprise more units, such as e.g. a second obtaining unit 809 for obtaining bearer establishment information from the second network node. This, and other tasks, could alternatively be performed by one of the other units.

The WCDs described above could be configured for the different method embodiments described herein, e.g. in regard of forwarding of a complete or partial WCD, i.e. at least part of a WCD, and obtaining information form the second, target, network node.

The WCD 800 may be assumed to comprise further functionality, for carrying out regular WCD functions. These functions may be at least partly different depending on in which type of network it operates.

Figure 9A:
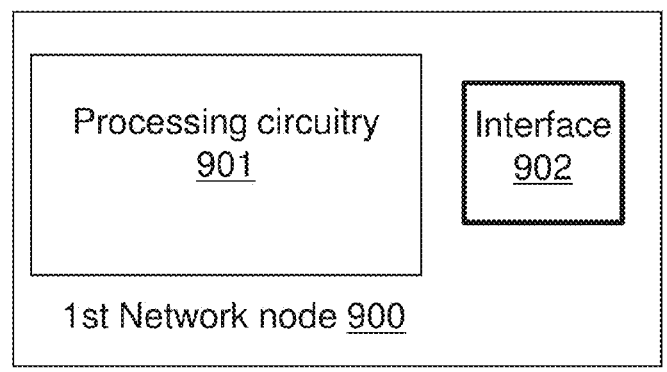
FIGS. 9a-c illustrate different implementations of a first network node, operable to be a source network node, according to exemplifying embodiments.
Figure 9B:
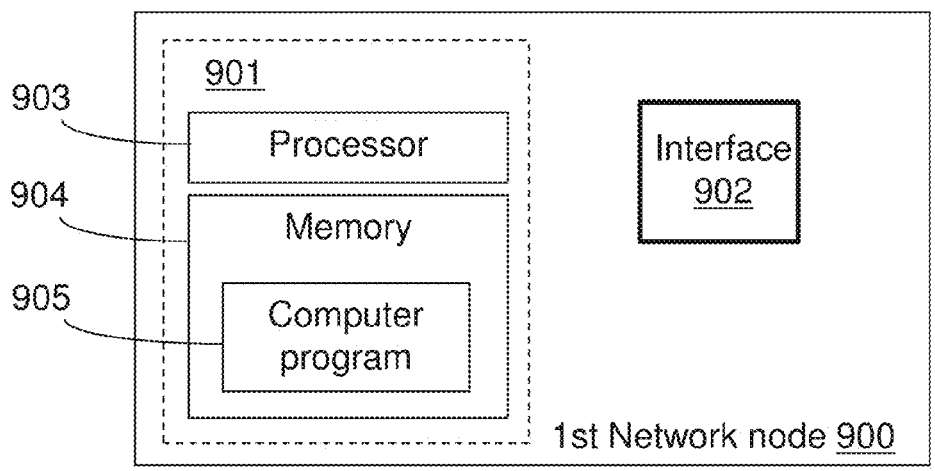
Figure 9C:
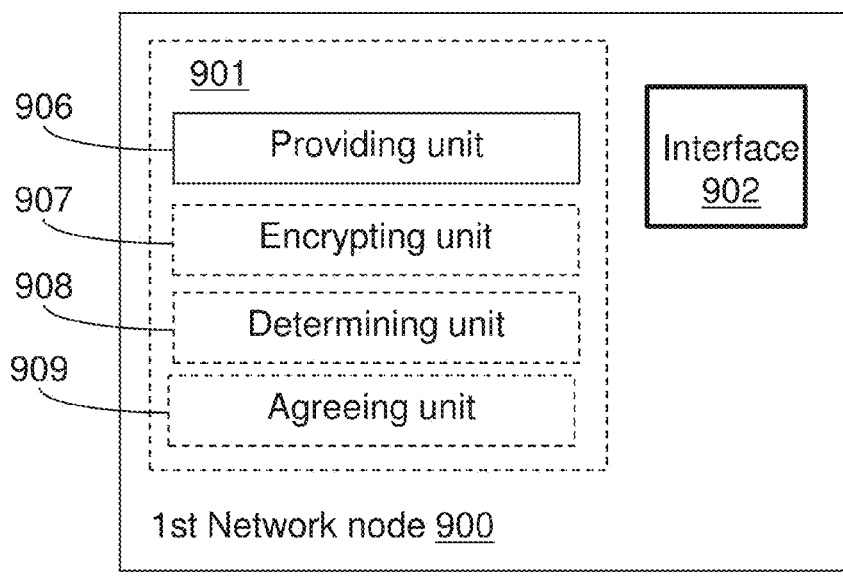

First Network Node, FIGS. 9a-9c

An exemplifying embodiment of a first network node is illustrated in a general manner in FIG. 9a. The first network node may, as previously described, an eNB or other access node operable in a communication network. The first network node 900 is configured to perform at least one of the method embodiments described above with reference to any of FIGS. 4 and 6. The first network node 900 is associated with the same technical features, objects and advantages as the previously described method embodiments. The first network node will be described in brief in order to avoid unnecessary repetition.

The first network node may be implemented and/or described as follows:

The first network node 900 comprises processing circuitry 901 and a communication interface 902. The processing circuitry 901 is configured to cause the first network node 900 to, when being connected to a WCD which is to be handed over from the first network node to a second network node: provide information comprising at least part of a WCD Context to the WCD for further transfer to the second network node, the WCD Context being related to the WCD. The processing circuitry 901 may further be configured to cause the first network node to encrypt at least part of the information using a key, $K_A$, which is shared between the first network node and the second network node. The communication interface 902, which may also be denoted e.g. Input/Output (I/O) interface, includes a network interface for sending data to and receiving data from WCDs, and also for communicating with other network nodes/core network.

The processing circuitry 901 could, as illustrated in FIG. 9b, comprise processing means, such as a processor 903, e.g. a CPU, and a memory 904 for storing or holding instructions. The memory would then comprise instructions, e.g. in form of a computer program 905, which when executed by the processing means 903 causes the first network node 900 to perform the actions described above.

An alternative implementation of the processing circuitry 901 is shown in FIG. 9c. The processing circuitry here comprises an obtaining unit 906, configured to cause the first network node to, when being connected to a WCD which is to be handed over from the first network node to a second network node: provide information comprising at least part of a WCD Context to the WCD for further transfer, i.e. forwarding, to the second network node, the WCD Context being related to the WCD. The processing circuitry may further comprise an encrypting unit 907, configured to cause the first network node to encrypt at least part of the information using a key, $K_A$, which is shared between the first network node and the second network node. The processing circuitry could comprise more units, such as e.g. a determining unit 908 for obtaining a characteristic of a backhaul link between the first network node and the second network node; and an agreement unit, for initiating an agreement with the second network node, based on said characteristic, about possible transfer of information comprising at least part of a WCD Context to the second network node via a WCD for handover, where the transferred information enables the second network node to derive the WCD Context.

The first network nodes described above could be configured for the different method embodiments described herein, e.g. in regard of what is comprised in the provided information.

The first network node 900 may be assumed to comprise further functionality, for carrying out regular network node functions. These functions may be at least partly different depending on in which type of network it operates.

Figure 10A:
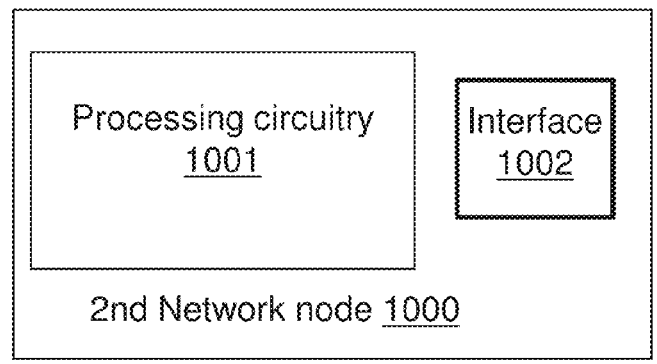
FIGS. 10a-c illustrate different implementations of a second network node, operable to be a target network node, according to exemplifying embodiments.
Figure 10B:
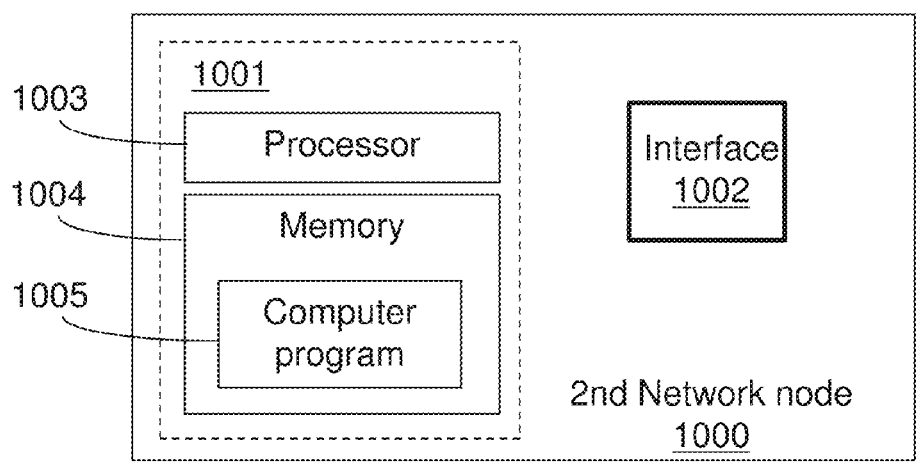
Figure 10C:
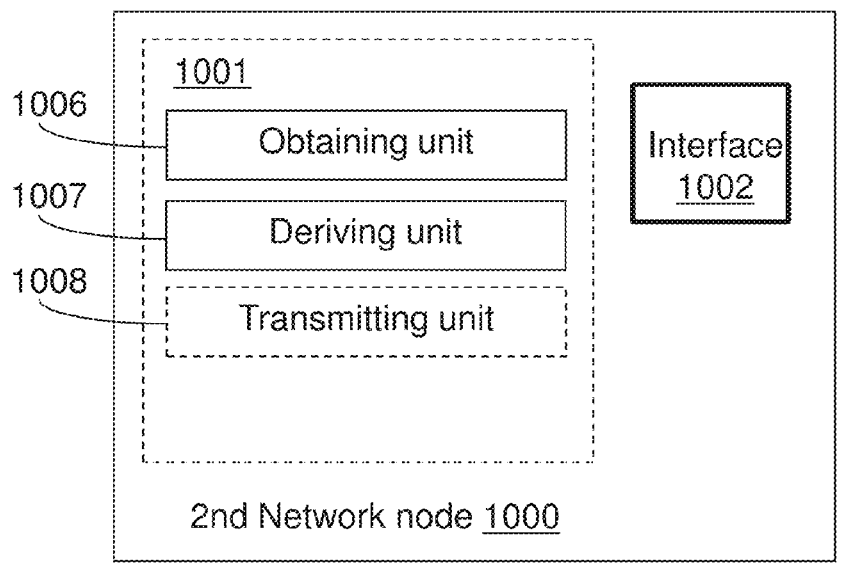
Figure 11:
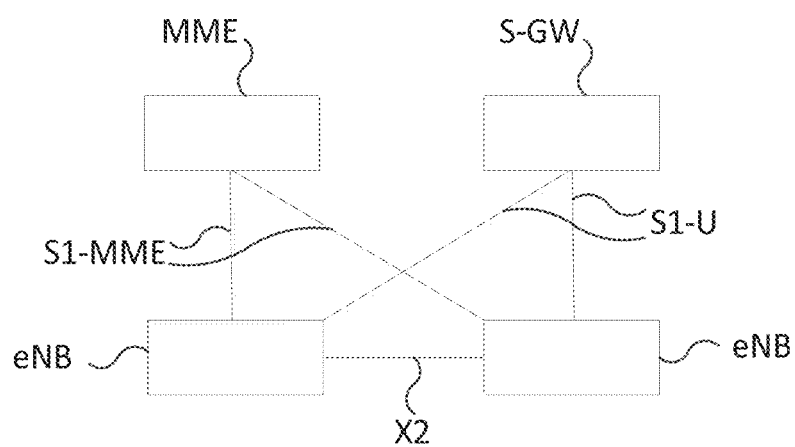
FIG. 11 illustrates a simplified view of an LTE network.

Second Network Node, FIGS. 10a-10c

Embodiments herein also relate to a second network node 1000 being operable in a wireless communication network. The second network node may be an eNB or other access node. An exemplifying embodiment of a second network node is illustrated in a general manner in FIG. 10a. The second network node 1000 is configured to perform at least one of the method embodiments described above e.g. with reference to any of FIGS. 5-9. The second network node 1000 is associated with the same technical features, objects and advantages as the previously described method embodiments. The second network node will be described in brief in order to avoid unnecessary repetition.

The second network node 1000 comprises processing circuitry 1001 and a communication interface 1002. The processing circuitry 1001 is configured to cause the second network node to obtain information comprising at least part of a WCD Context from a WCD to be handed over from a first network node to the second network node, the WCD Context being related to the WCD.

The processing circuitry 1001 is further configured to cause the second network node to derive the WCD Context based on the obtained information. The processing circuitry 1001 may further be configured to cause the second network node to transmit a message to the WCD based on the derived WCD Context. The communication interface 1002, which may also be denoted e.g. Input/Output (I/O) interface, includes a network interface for sending data to and receiving data from other nodes.

The processing circuitry 1001 could, as illustrated in FIG. 10b, comprise processing means, such as a processor 1003, and a memory 1004 for storing or holding instructions. The memory would then comprise instructions, e.g. in form of computer program 1005, which when executed by the processing means 1003 causes the second network node 1000 to perform the actions described above.

An alternative implementation of the processing circuitry 1001 is shown in FIG. 10c. The processing circuitry here comprises an obtaining unit 1006, configured to cause the second network node to obtain information comprising at least part of a WCD Context from a WCD to be handed over from a first network node to the second network node, the WCD Context being related to the WCD. The processing circuitry further comprises a deriving unit 1007, configured to cause the network control node to derive the WCD Context based on the obtained information. The processing circuitry may further comprise a transmitting unit 1008 for transmitting a message to the WCD based on the derived WCD Context.

Thus, the second network node is configured and operable to enable the first network node to adapt a transmission or reception of the second block of information based on the indicated relation.

The second network node 1000 may be assumed to comprise further functionality, for carrying out regular node functions. These functions would be at least partly different depending on in which type of network it operates.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the nodes. The nodes described above may be implemented in a so-called cloud solution, referring to that the implementation may be distributed, and that what is referred to as a node therefore may be a so-called virtual node or a virtual machine.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities

ABBREVIATIONS

AS Access Stratum
ASME Access Security Management Entity
CN Core Network
DL Downlink
eNB eNodeB
HO Handover
LTE Long Term Evolution
MAC Medium Access Control
MME Mobility Management Entity
NAS Non-Access Stratum
NH Next Hop
NW Network
OaM Operation and Management
OAM Operation, Administration, Maintenance
RRC Radio Resource Control
S-GW Serving Gateway
SR Scheduling Request
UE User Equipment
UL Uplink
UP User Plane
WCD Wireless Communication Device

The invention claimed is:

1. A method for handover performed by a Wireless Communication Device (WCD) connected to a first network node, the method comprising:
   obtaining, from the first network node, information comprising at least part of a WCD Context related to the WCD;
   connecting to a second network node; and
   forwarding the obtained information to the second network node, enabling the second network node to derive the WCD Context based on the information.

2. The method according to claim 1, wherein the information is obtained in an encrypted format that is decryptable by the second network node.

3. The method according to claim 1, wherein the information comprises at least one of:
   an indication of a security key shared between the first network node and the second network node;
   information about security capabilities of the WCD; and
   a security key derived from at least part of a WCD context shared between the WCD and the first network node.

4. The method according to claim 3, wherein the information about security capabilities comprises an identifier of an encryption algorithm implemented in the WCD.

5. The method according to claim 1, further comprising obtaining bearer establishment information from the second network node.

6. A method for handover performed by a first network node connected to a Wireless Communication Device (WCD), the method comprising, when the WCD is to be handed over from the first network node to a second network node, providing information comprising at least part of a WCD Context to the WCD, for further transfer to the second network node, the WCD Context being related to the WCD.

7. The method according to claim 6, further comprising encrypting at least part of the information using a security key shared between the first network node and the second network node.

8. The method according to claim 6, wherein the information comprises at least one of:
   an identifier of a security key shared between the first network node and the second network node;
   information about security capabilities of the WCD; and
   a security key derived from at least part of a WCD context shared between the WCD and the first network node.

9. The method according to claim 8, wherein the information about security capabilities comprises an encryption algorithm implemented in the WCD.

10. The method according to claim 6, further comprising:
    obtaining a characteristic of a backhaul link between the first network node and the second network node; and
    initiating an agreement with the second network node, based on said characteristic, about possible transfer of information comprising at least part of a WCD Context to the second network node via a WCD for handover, where the transferred information enables the second network node to derive the WCD Context.

11. A method for handover performed by a second network node, the method comprising:
    obtaining information comprising at least part of a Wireless Communication Device (WCD) Context from a WCD to be handed over from a first network node to the second network node, the WCD Context being related to the WCD; and
    deriving the WCD Context based on the obtained information.

12. The method according to claim 11, further comprising transmitting a message to the WCD based on the WCD Context.

13. The method according to claim 11, wherein the deriving of the WCD Context comprises decrypting the obtained information using a key that is shared between the first network node and the second network.

14. The method according to claim 11, wherein the deriving of the WCD comprises reconstructing the WCD Context from the obtained information.

15. The method according to claim 11, wherein the information comprises at least one of:

an indication of a security key shared between the first network node and the second network node;

information about security capabilities of the WCD; and a security key derived from at least part of a WCD context shared between the WCD and the first network node.

16. The method according to claim 15, wherein the information about security capabilities comprises an identifier of an encryption algorithm implemented in the WCD.

17. The method according to claim 11, wherein the method further comprises providing an acknowledgement of the reception of the information to the WCD.

18. The method according to claim 11, further comprising providing bearer establishment information to the WCD.

19. A Wireless Communication Device (WCD) operable in a wireless communication network, the WCD being configured to:
obtain, from a first network node when being connected to said first network node, information comprising at least part of a WCD Context related to the WCD;
connect to a second network node; and
forward the obtained information to the second network node, enabling the second network node to derive the WCD Context based on the information.

20. The WCD according to claim 19, being configured to obtain the information in an encrypted format.

21. The WCD according to claim 19 being further configured to obtain bearer establishment information from the second network node.

22. A first network node being configured to, when a Wireless Communication Device (WCD) connected to the first network node is to be handed over from the first network node to a second network node, provide information comprising at least part of a WCD Context to the WCD, for further transfer to the second network node, the WCD Context being related to the WCD.

23. The first network node according claim 22, being further configured to encrypt at least part of the information using a security key shared between the first network node and the second network node.

24. The first network node according claim 22, being further configured to:
obtain a characteristic of a backhaul link between the first network node and the second network node; and to
initiate an agreement with the second network node, based on said characteristic, about possible transfer of information comprising at least part of a WCD Context to the second network node via a WCD for handover, where the transferred information enables the second network node to derive the WCD Context.

25. A second network node, being configured to:
obtain information comprising at least part of a Wireless Communication Device (WCD) Context from a WCD to be handed over from a first network node to the second network node, the WCD Context being related to the WCD; and
derive the WCD Context based on the obtained information.

26. The second network node according to claim 25, being further configured to transmit a message to the WCD based on the WCD Context.

27. The second network node according to claim 26, wherein the deriving of the WCD Context comprises decrypting the obtained information using a security key that is shared between the first network node and the second network.

28. The second network node according to claim 25, wherein the deriving of the WCD comprises reconstructing the WCD Context from the obtained information.

29. The second network node according to claim 25, being further configured to provide an acknowledgement of the reception of the information to the WCD.

30. The second network node according to claim 25, being further configured to provide bearer establishment information to the WCD.

* * * * *